March 21, 1950
J. V. KRESSER
2,501,340
CONTROL SYSTEM FOR PLURAL PRIME
MOVER DYNAMO PLANTS
Filed Aug. 15, 1946
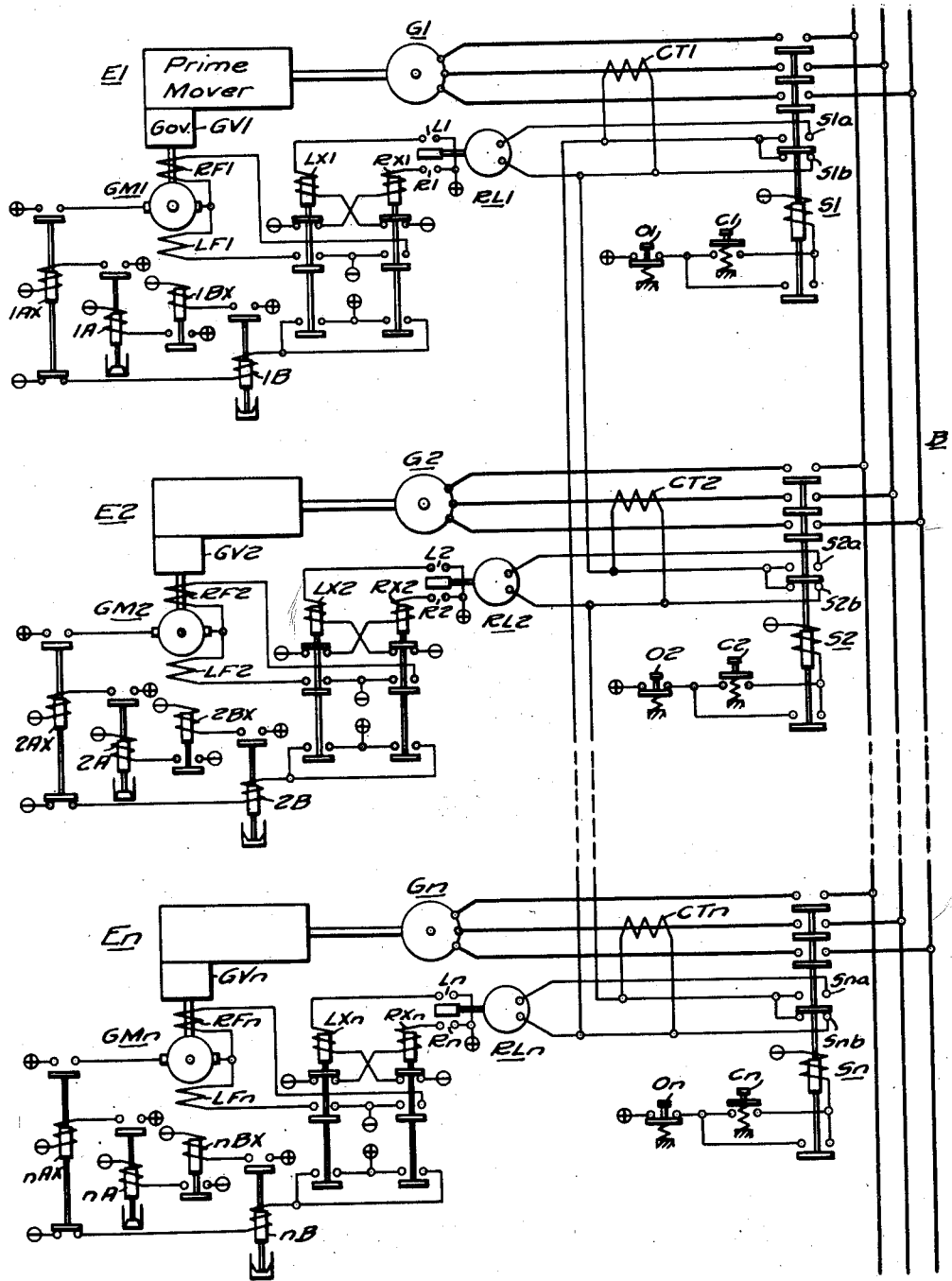
WITNESSES:
INVENTOR
Jean V. Kresser.
BY
ATTORNEY Patented Mar. 21, 1950

2,501,340

UNITED STATES PATENT OFFICE 2,501,340

CONTROL SYSTEM FOR PLURAL PRIME MOVER DYNAMO PLANTS

Jean V. Kresser, San Francisco, Calif., assignor to Westinghouse Electric Corporation, East Pittsburgh, Pa., a corporation of Pennsylvania Application August 15, 1946, Serial No. 690,627

5 Claims. (Cl. 290—4)

My invention relates, generally, to control systems and, more particularly, to systems for automatically controlling the operation of the governors for engine-driven generators.

When a number of engine-driven generators are operating in parallel, it is frequently quite a problem to maintain the desired division of load between the machines because the governors are not equally responsive and the engines do not have exactly the same load characteristics. Therefore, there is a tendency for one or more machines to deliver more than their share of the load and for another or more machines to run lightly loaded, or idle, or in the extreme case to run as motors drawing power from the other machines.

An object of my invention, generally stated, is to provide a system for automatically adjusting the governors of engine-driven generators which shall be simple and efficient in operation and which may be economically manufactured and installed.

A more specific object of my invention is to provide for periodically adjusting the governor setting whenever the load delivered by any machine differs from its proper share by a predetermined amount.

Another object of my invention is to prevent overshooting and hunting of a governor control system.

Other objects of my invention will be explained fully hereinafter or will be apparent to those skilled in the art.

In accordance with one embodiment of my invention, the operation of the governor adjusting motors for a plurality of engine-driven generators is so controlled by relays responsive to the load carried by each generator that the setting of the governor for each machine is raised or lowered whenever the load delivered by that machine differs from its proper share by a predetermined amount.

For a fuller understanding of the nature and objects of my invention, reference may be had to the following detailed description, taken in conjunction with the accompanying drawing, in which the single figure is a diagrammatic view of a control system embodying the principal features of my invention.

Referring to the drawing, the system shown therein comprises a plurality of generators G1, G2 and G$n$ which may be connected in parallel-circuit relation to a bus B by switches S1, S2 and S$n$, respectively. As indicated by the dotted lines, any number of machines may be inserted between G2 and G$n$ with additional equipment connected in the same manner as for the machine shown.

The switch S1 may be closed by closing a pushbutton switch C1 and opened by opening a pushbutton switch O1. Likewise, the switches S2 and S$n$ may be closed and opened by means of pushbutton switches C2, O2 and C$n$, O$n$, respectively.

A current transformer having a secondary winding CT1 is provided for the generator G1. Similar transformers CT2 and CT$n$ are provided for the generators G2 and G$n$, respectively. If the machines have different ratings, the transformer ratios may be such that all current transformer secondary currents are equal when each machine is carrying its proper share of load.

The generator G1 is driven by an engine E1 which is provided with a governor GV1, which may be adjusted by a governor motor GM1 having a "raise" field winding RF1 and a "lower" field winding LF1. Likewise, the generators G2 and G$n$ are driven by engines E2 and E$n$, respectively. The engine E2 is provided with a governor GV2 which may be adjusted by a motor GM2 having "raise" and "lower" field windings RF2 and LF2, respectively. The engine E$n$ has a governor GV$n$ which may be adjusted by a motor GM$n$ having field windings RF$n$ and LF$n$.

In order to overcome the tendency for one machine to deliver more than its share of the load and for another machine to run lightly loaded, I have devised a system for automatically adjusting the governors. By means of this system, there is a periodic readjustment of the governor settings whenever the load delivered by any machine differs from its proper share by more than a predetermined amount.

As shown, a relay RL1, which may be either of a current type or of a watt type, is connected across the current transformer CT1 through an auxiliary switch S1$a$ when the switch S1 is closed to connect the generator G1 to the bus B. When the switch S1 is open, the current transformer is shunted through an auxiliary switch S1$b$. Similar relays RL2 and RL$n$ are connected across their respective current transformers CT2 and CT$n$ through auxiliary switches S2$a$ and S$n$$a$. The transformers CT2 and CT$n$ are shunted by auxiliary switches S2$b$ and S$n$$b$ when the switches S2 and S$n$ are open.

Thus, the transformer secondaries are connected in series-circuit relation and the relays RL1, RL2 and RL$n$ are so connected that the current through each relay is proportional to the departure of the current of its associated machine from the current which this machine should carry if it was delivering its proper share of the load. Furthermore, the relay current is in one direction when its associated machine is carrying more than its share of load and in the opposite direction when its associated machine is carrying less than its share of the load. The relay current is zero only when its machine is carrying its proper share of the load. Therefore, any relay which is responsive to current may be utilized.

Since alternating current generators are usually equipped with voltage regulators and when alternating current generators are operated in parallel their voltage regulators are equipped with cross current compensation devices, the division of reactive kv.-a. load of the generators will always be correct if the regulators are in proper adjustment. Therefore, if the load component of the generator current is brought to a proper value then the total current of each generator should be in direct proportion to the load carried by this generator since all generators are operating in parallel and have the same power factor.

In order to prevent hunting and overshooting of the system and also to prevent too frequent operation when the load variations are only temporary, the governor motor may be energized only for a short period of time at regular intervals so long as the relay indicates that a change in the governor setting is necessary. This is accomplished by providing timing relays 1A and 1B and auxiliary relays 1AX, 1BX, LX1 and RX1 which cooperate with the relay RL1 in controlling the governor motor GM1. Similar relays 2A, 2B, 2AX, 2BX, LX2 and RX2 are provided for the machine G2 and relays $n$A, $n$B, $n$AX, $n$BX, LX$n$ and RX$n$ are provided for the machine G$n$. In this manner, the adjustment on each machine is in small increments and the machines are gradually loaded properly, thereby minimizing the possibility of overshooting and hunting.

Assuming that the relay RL1 indicates by closing its contact members R1 that its governor setting should be raised, the relay RX1 is energized which closes its contact members to energize the relay 1B. After a predetermined time interval, the relay 1B closes its contact members to energize the relay 1BX which, in turn, energizes the relay 1A. The closing of the contact members of relay 1A energizes the relay 1AX which closes its contact members to energize the armature and the RF1 windings of the governor motor GM1 through another set of contact members on the relay RX1.

The governor motor will remain energized for a short period of time only and will then be deenergized by the opening of the contact members of the relay 1A which has a time delay on opening. When the relay 1AX closes its front contact members to energize the governor motor, its back contact members are opened to deenergize 1B which drops out to deenergize 1BX which, in turn, deenergizes 1A. After a time interval, 1A drops out to deenergize 1AX, thereby deenergizing the governor motor.

If the contact members R1 of the relay RL1 are still closed, the foregoing sequence is repeated. This sequence of energizing the governor motor for a short time at definite intervals will continue until the control relay RL1 is in balance, which occurs when the division of load is correct. The governor setting is lowered in a similar manner by the closing of the contact members L1 of the relay RL1.

The sequence of operation of the apparatus for adjusting machines G2 and G$n$ is similar to that for the machine G1. It will be understood that timing relays of other types may be utilized to secure the desired operation.

From the foregoing description, it is apparent that I have provided a system for automatically adjusting the governors of engine driven generators to maintain a proper division of load between a plurality of machines operating in parallel. The present system is relatively simple and may be installed by utilizing apparatus of well known types.

Since numerous changes may be made in the above-described construction and different embodiments of the invention may be made without departing from the spirit and scope of the invention, it is intended that all matter contained in the foregoing description or shown in the accompanying drawing shall be interpreted as illustrative and not in a limiting sense.

I claim as my invention:

1. In a control system, in combination, a plurality of alternating current generators, an engine for driving each one of the generators, a governor for each engine, switching means for connecting the generators in parallel-circuit relation, means for adjusting the governor settings, relay means for each generator responsive to the differential load current of its generator for controlling the operation of the governor adjusting means, and timing means for delaying the operation of said governor adjusting means for a predetermined time interval after the operation of said relay means.

2. In a control system, in combination, a plurality of alternating current generators, an engine for driving each one of the generators, a governor for each engine, switching means for connecting the generators in parallel-circuit relation, means for adjusting the governor settings, relay means for each generator responsive to the differential load current of its generator for controlling the operation of the governor adjusting means, and timing means for limiting the time of operation of the governor adjusting means.

3. In a control system, in combination, a plurality of alternating current generators, an engine for driving each one of the generators, a governor for each engine, switching means for connecting the generators in parallel-circuit relation, means for adjusting the governor settings, relay means for each generator responsive to the differential load current of its generator for controlling the operation of the governor adjusting means, means for delaying the operation of said governor adjusting means for a predetermined time interval after the operation of said relay means, and timing means for limiting the time of operation of the governor adjusting means.

4. In a control system, in combination, a plurality of alternating current generators, an engine for driving each one of the generators, a governor for each engine, switching means for connecting the generators in parallel-circuit relation, a current transformer for each generator, the secondary windings of said transformers being connected in series-circuit relation, means for adjusting the governor settings, relay means for each generator energized by differential current from said transformers for controlling the operation of the governor adjusting means, and timing means for delaying the operation of said governor adjusting means for a predetermined time interval after the operation of said relay means.

5. In a control system, in combination, a plurality of alternating current generators, an engine for driving each one of the generators, a governor for each engine, switching means for connecting the generators in parallel-circuit relation, a current transformer for each generator, the secondary windings of said transformers being connected in series-circuit relation, means for adjusting the governor settings, relay means for each generator energized by differential current from said transformers for controlling the operation of the governor adjusting means, auxiliary switching means actuated by said switching means for controlling the energization of said relay means, and timing means for delaying the operation of said governor adjusting means for a predetermined time interval after the operation of said relay means.

JEAN V. KRESSER.

REFERENCES CITED

The following references are of record in the file of this patent:

UNITED STATES PATENTS

| Number | Name | Date |
| --- | --- | --- |
| 1,844,720 | Stivender | Feb. 9, 1932 |
| 1,907,517 | De Camp | May 9, 1933 |
| 1,920,544 | Ashbaugh et al. | Aug. 1, 1933 |
| 1,984,940 | Plechl | Dec. 18, 1934 |
| 2,015,555 | Fountain | Sept. 24, 1935 |
| 2,059,651 | Pfau | Nov. 3, 1936 |
| 2,228,153 | Pfau | Jan. 7, 1941 |
| 2,315,490 | Alexanderson | Apr. 6, 1943 |